Patented Aug. 18, 1936

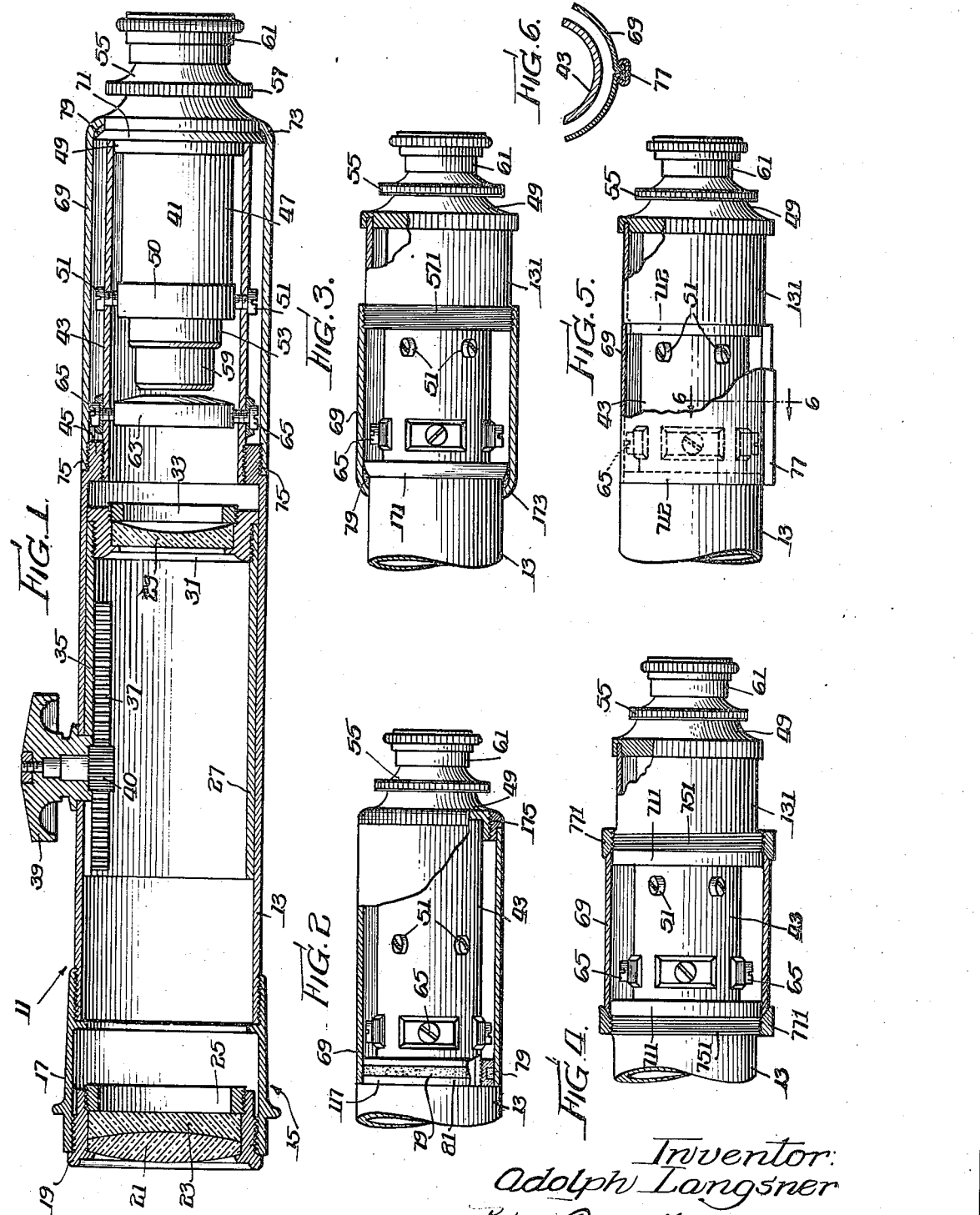

2,051,050

UNITED STATES PATENT OFFICE 2,051,050

TELESCOPE

Adolph Langsner, Chicago, Ill., assignor to Eugene Dietzgen Co., Chicago, Ill., a corporation of Delaware Application October 25, 1933, Serial No. 695,086

12 Claims. (Cl. 88—32)

My invention relates in general to measuring instruments and has more particular reference to telescopes, such as are commonly used in surveying. Telescopes of this character are usually provided internally with adjustable cross hairs and focusing adjustments and it is an important object of my present invention to provide means whereby internal telescope adjustments as of cross hairs, focusing and the like, may be accomplished without permitting the ingress into the telescope of dust or other foreign matter, which, in time, results in fouling the instrument.

Another object is to provide a telescope having internal adjustable parts with means for ensuring the exclusion of foreign matter.

Another object is to provide a substantially dust-proof, internally-adjustable telescope.

Another object is to provide a dust-proof case for a telescope having internal adjustments, said case permitting the easy manipulation of the internal adjustable parts without exposing the enclosed parts to the ingress of foreign matter.

Another object is to provide a telescope having a casing carrying externally operable devices for adjusting the telescope internally, said casing including readily removable dust-proof cover means for enclosing said adjusting devices.

These and numerous other objects and advantages will be more fully understood from the following description, which, taken in connection with the accompanying drawing, discloses several preferred embodiments of my invention.

Referring to the drawing:

Figure 1 is a sectional view taken longitudinally of a telescope embodying my present invention;

Figures 2, 3, 4, and 5 are perspective views, partially in section, illustrating modified constructions embodying my present invention; and Figure 6 is a sectional view taken substantially along line 6—6 in Figure 5.

To illustrate my invention, I have shown on the drawing, a telescope 11 having a tubular barrel 13 forming a casing. The barrel carries focusing means and an eye piece 41 mounted thereon in a dust-proof manner. Any suitable eye-piece construction and focusing arrangement may be utilized. For the purpose of illustrating my invention, however, the focusing is accomplished by means of a stationary objective lens assembly mounted at one end of the barrel and a focusing lens mounted for longitudinal adjustment within the barrel, the eye piece being located at the end of the barrel opposite from the objective lens. Other focusing arrangements may be utilized without departing from the spirit and scope of the invention, which, as will be more fully appreciated as the description proceeds, relates more especially to the dust-proof adjustment facilities which I have provided in conjunction with the eye piece.

The illustrated focusing mechanism comprises an objective cell 15 comprising a sleeve 17 threaded or otherwise fastened to one end of the barrel, a lens-holding collar 19 carrying lenses 21 and 23 and threaded or otherwise secured in the sleeve 17 opposite the end of the barrel 13 and a holding gland 25 comprising a collar threaded or otherwise fastened in the lens-holding collar 19 behind the lenses to hold the same in place.

Within the barrel 13, a slidable focusing sleeve 27 is mounted for longitudinal movement within the barrel. The sleeve 27 preferably carries a lens 29, which is mounted in a holding collar 31, the lens being secured in the collar in any suitable fashion as by means of the gland 33 threaded into the collar 31 behind the lens, the collar in turn being threaded or otherwise secured in the end of the focusing sleeve.

Focusing is accomplished by moving the sleeve 27 longitudinally within the barrel in order to vary the space between the objective lenses 21 and 23 and the focusing lens 29. Suitable dust-proof means, operable from outside the barrel in order to adjustably shift the focusing sleeve, is provided. In the illustrated embodiment, the focusing sleeve is provided with a longitudinal slot 35 and a rack 37, adjacent the slot, is fastened to the inner wall of the sleeve 27. A manually turnable knob 39 is also snugly journaled in the walls of the barrel 13 and has an inner end projecting in the slot 35 and carrying a pinion 40 in position engaging the rack so that by turning the knob 39 outside of the barrel, the sleeve 27 may be adjusted longitudinally within the barrel. The knob is formed to co-operate with the barrel opening through which it extends to exclude the ingress of dust into the barrel at this point.

The eye piece 41 is located at the end of the barrel opposite from the objective cell 15 and is preferably mounted in a barrel extension 43 of restricted diameter. The extension 43 may be formed on the barrel in any suitable fashion. Preferably, as shown in the drawing, the extension comprises a cylindrical sleeve threaded into a bushing 45 formed at one end of the barrel 13. The sleeve 43 carries the eye piece substantially in alignment with the longitudinal axis of the barrel, that is to say, in line with the objective lenses 21 and 23 and the focusing lens 29.

Any suitable or preferred eye-piece assembly may be utilized. The assembly illustrated comprises a sleeve 47 secured at its outer end 49 in a dust-proof fashion in the end of the barrel extension 43, the inner end of the sleeve 47 being carried in a yoke 50 adjustably supported from the barrel extension 43 by means of the adjusting screws 51. Within the collar 47, an eye-piece focusing sleeve 53 is slidably mounted. The eye-piece focusing sleeve 53 has a portion 55 extending outwardly of the outer end of the sleeve 47 and the edge of the outwardly extending portion 55 is or may be knurled as at 57 in order to facilitate manipulation of the focusing sleeve from outside of the telescope. The focusing sleeve 53 carries the eye-piece tube 59 and this tube extends outwardly of the focusing sleeve portion 55 and is provided with a cover cap 61. Within the barrel extension 43, immediately in front of the inner end of the eye-piece tube 59, is mounted an adjustable reticle 63 containing cross hairs or stadia wires, the same being adjustably mounted on the sleeve portion 43 by means of the set screws 65.

It is an important object of my present invention to provide means for preventing the entrance of foreign matter into the interior of the barrel and barrel extension at the adjusting screws 51 and 55. It is for this purpose that the barrel is formed to reduced size in the barrel extension 43 and, in order to normally prevent foreign matter from entering the barrel at the adjusting screws, I provide cover means 69 snugly enclosing the adjusting screws 51 and 65 at all times except when adjustments are to be made. The cover means 69 is adapted to be quickly and easily manipulated to expose the adjusting screws. After adjustment is accomplished, the cover means may be quickly and easily replaced in order to exclude foreign matter from the adjusting devices and hence from entering the barrel at the points of adjustment.

In Figure 1, the eye-piece sleeve 47 is formed with a seat 71 and the barrel 13 is formed with a depression containing screw threads 75. The cover 69 comprises a sleeve internally threaded at one end to mate with the threaded end of the barrel, the cover sleeve 69 being formed at its oposite end with an inwardly disposed annular flange 73 adapted to seat upon and snugly engage in a resilient fashion the seat 71 when the cover sleeve 69 is fully threaded on the barrel 13, the threaded connection of the sleeve with the barrel and the resilient frictional engagement of the sleeve with the seat 71 providing a seal admirably adapted to exclude foreign matter from the space between the cover sleeve 69 and the barrel extension 43.

In Figure 2 of the drawing, the barrel 13 is provided with a depression forming a seat 117, while the eye-piece collar is formed with external screw threads 69. The cover-sleeve 69, at one end, is formed with internal screw threads adapted to engage the external threads of the eye-piece collar, the sleeve being formed, at its other end, to snugly seat upon and engage the cylindrical walls of the annular seat 117 so that by telescoping the sleeve over the barrel extension 43 and mating the threaded portions of the sleeve and eye-piece collar, the adjusting screws 51 and 65 are hidden and fully protected from deleterious foreign matter. It should be noted that both of the arrangements shown in Figures 1 and 2, when the dust cover sleeve 69 is in place, present a smooth, continuous, finished exterior in the telescope.

In Figures 3, 4, and 5, the end 49 of the eye-piece sleeve is formed with an inwardly extending sleeve or skirt 131 terminating behind and adjacent the adjusting screws 51 and 65 and the cover member 69 is detachably secured in a dust-proof fashion to the inner end of the sleeve 131, the cover 69 extending from the inner end of the sleeve or skirt 131 to the adjacent end of the barrel 13 and being likewise secured in a detachable yet dust-proof manner to the barrel, thus covering the adjusting screws 51 and 65.

In Figure 3, the cover member 69 comprises a sleeve threaded at its outer end to co-operate with corresponding threads 571 formed on the inner end of the sleeve or skirt 131, the opposite end of the cover member 69 being flanged inwardly as at 173 to snugly and resiliently seat upon an outwardly flared seat 171 formed on the barrel 13. The flanged portions 173 of the cover 69 may slide upon the outer surface of the barrel 13 in order to permit the cover sleeve to be threadingly engaged with the skirt 131. When the cover sleeve 69 is disconnected from the skirt, it may be slid along the barrel 13 toward the left, viewing Figure 3, in order to uncover the adjusting screws 51 and 65. As the sleeve 69 is threaded onto the skirt 131 following the adjustment of the screws 51 and 65, the flanged portions 173 will become yieldingly and snugly pressed upon the seat 171 (washer) so that the adjusting screws are protected against the ingress of dust and other foreign matter.

In Figure 4 of the drawing, the inner end of the skirt 131 and also the adjacent end of the barrel 13 are provided with external screw threads 751 and adjacent seating surfaces 711. The cover 69 comprises a cylindrical member, the opposite edges of which are adapted to seat upon the surfaces 711. The opposite edges of the cover member 69 also are beveled and fastening members 771, comprising nuts threading upon the threaded portions 751 and having beveled portions adapted to co-operate with the beveled ends of the cover member, are adapted to hold said member snugly in place to thus exclude foreign matter from the adjusting screws. When it is desired to expose the fastening nuts 51 and 65, one of the fastening members 771, preferably the one mounted on the barrel 13, is unthreaded and slid along the barrel permitting the cover member likewise to be telescoped onto the barrel, thus exposing the adjusting screws.

In Figures 5 and 6 of the drawing, the inner edge of the skirt 131 and the opposed end of the barrel 13 are provided with depressed portions forming spaced seats 712, between which the adjusting screws 51 and 65 are exposed. The cover member 69 comprises a sheet preferably of flexible material adapted to be wrapped around the adjusting screws with the opposite edges of the sheet engaging in the seat 712. In order to hold the cover member in place, any suitable fastening means is applied preferably to the abutting end edges of the sheet forming the cover member after the same has been applied on the seat 712. The sheet material, forming the cover member, may be of any suitable dust-proof material, such as leather, celluloid, or other flexible imperforate and preferably water-proof material, but I prefer to utilize relatively thin sheet metal for the purpose and to provide for fastening the cover member in place by curling outwardly the opposite end edges of the strip and providing a slide catch 77, as shown in Figure 6, to hold the curled edges together in a dust-proof fashion.

I may also provide the frictional seating surfaces 71, in Figure 1; 117 in Figure 2; 171 in Figure 3; 711 in Figure 4; and 712 in Figure 5, with an annular sealing gasket 79. This gasket is preferably formed of resilient material, such for instance as felt, and is or may be secured upon the seating surfaces mentioned or on the cooperating seating portions of the cover member 69 in any suitable manner, although I prefer to secure the gasket in place by means of a suitable adhesive, such as shellac. Alternately, the seating surfaces, on which the sealing gasket is mounted, may be depressed to form an annular groove 81, as shown in Figure 2, in which the gasket is received.

It is thought that the invention and numerous of its attendant advantages will be understood from the foregoing description, and it is obvious that numerous changes may be made in the form, construction, and arrangement of the several parts without departing from the spirit or scope of my invention, or sacrificing any of its attendant advantages; the forms herein described being preferred embodiments for the purpose of illustrating my invention.

Having thus described my invention, what I claim as new and desire to secure by Letters Patent is as follows:

1. A telescope comprising a barrel having a sleeve portion forming an extension of said barrel, an eye piece carried by said extension and extending outwardly of one end of said extension, means on said barrel forming a seat adjacent the other end of the extension, an adjustable element within said extension, adjusting means on said extension and accessible from the outside of the extension for adjusting the adjustable element, and a cover comprising a sleeve of resilient material adapted to enclose said extension, said cover sealingly engaging the eye piece and the seat at opposite ends of said extension to exclude foreign matter from said adjusting means, said sleeve and eye piece being formed with cooperating threaded portions for securing the sleeve on the barrel in position enclosing said extension, said sleeve and said seat having cooperating portions adapted for frictional sealing engagement when the sleeve is connected on the eye piece.

2. A telescope comprising a barrel having a sleeve portion forming an extension of said barrel, an eye piece carried by said extension and extending outwardly of one end of said extension, means on said barrel forming a seat adjacent the other end of the extension, an adjustable element within said extension, adjusting means on said extension and accessible from the outside of the extension for adjusting the adjustable element, and a cover comprising a sleeve of resilient material adapted to enclose said extension, said cover sealingly engaging the eye piece and the seat to exclude foreign matter from said adjusting means, said sleeve and eye piece being formed with threaded means for securing the sleeve to the eye piece in position to enclose the extension, and said sleeve having a portion adapted to resiliently engage the seat at the end of the extension opposite from said eye piece whereby to utilize the resilience of the sleeve to firmly seal the sleeve to the seat when the same is secured on the eye piece by said threaded means.

3. A telescope comprising a barrel having a sleeve portion forming an extension of said barrel, an eye piece carried by said extension and extending outwardly of one end of said extension, means on said barrel forming a threaded seat adjacent the other end of the extension, an adjustable element within said extension, adjusting means on said extension, and accessible from the outside of the extension for adjusting the adjustable element, and a cover comprising a sleeve of resilient material adapted to enclose said extension, said eye piece being formed with a seat facing away from said extension, and said sleeve having an end formed for threaded engagement with the threaded seat, said sleeve being flanged at its opposite end to resiliently engage said eye piece seat when the sleeve is threaded on the threaded seat.

4. A telescope comprising a barrel having a sleeve portion forming an extension of said barrel, an eye piece frame carried by said extension and extending outwardly of one end of said extension to form a seat, means on said barrel forming a seat adjacent the other end of the extension, an adjustable element within said extension, adjusting means on said extension, and accessible from the outside of the extension for adjusting the adjustable element, and a cover comprising a sleeve of resilient material adapted to enclose said extension, and an annular packing gasket interposed between an end of said sleeve and one of said seats.

5. A telescope comprising a barrel having a sleeve portion forming an extension of said barrel, an eye piece carried by said extension and extending outwardly of one end of said extension, means on said barrel forming a seat adjacent the other end of the extension, an adjustable element within said extension, adjusting means on said extension, and accessible from the outside of the extension for adjusting the adjustable element, and a cover comprising a sleeve of resilient material adapted to enclose said extension, said seat being formed in position facing away from said extension, and said sleeve being formed at one end for threaded engagement with said eye piece, said sleeve being flanged at its other end to resiliently engage the said seat when threaded on the eye piece.

6. A telescope comprising a barrel having a sleeve portion forming an extension of said barrel, an eye piece carried by said extension and extending outwardly of one end of said extension, means on said barrel forming a seat adjacent the other end of the extension, an adjustable element within said extension, adjusting means on said extension, and accessible from the outside of the extension for adjusting the adjustable element, and a cover comprising a sleeve of resilient material adapted to enclose said extension, said seat being formed in position facing away from said extension, and said sleeve being formed at one end for threaded engagement with said eye piece, said sleeve being flanged at its other end to resiliently engage the said seat when threaded on the eye piece, and an annular sealing gasket interposed between the flanged end of the sleeve and said seat.

7. A telescope comprising a barrel having a sleeve portion defined between cover carrying portions, at least one of which is threaded and another of which provides a seat facing away from said sleeve portion, an adjustable element within the sleeve portion, adjusting means on said sleeve portion accessible from outside of the barrel to adjust said element within the barrel, and a cover comprising a sleeve encircling said sleeve portion and sealingly secured to the enlarged portions, said sleeve being formed for threaded engagement with said threaded cover carrying portion, and for resilient engagement with the seat provided in the other cover carrying portion, whereby to utilize the resilience of the sleeve to snugly seal the same on said cover carrying portions.

8. A telescope comprising a barrel having a sleeve portion defined between spaced portions forming seats, an adjustable element within the sleeve portion, means accessible between said seat-forming portions to adjust said element within the sleeve portion, a cover comprising a sleeve encircling said sleeve portion and sealingly secured to the seat-forming portions, threaded means for securing at least one end of said sleeve on one of said seats, and means forming an abutment on the other seat-forming portion with which the other end of said sleeve has resilient engagement, whereby to utilize the resilience of the sleeve to snugly seal the same on said seats in position enclosing the sleeve portion.

9. A telescope as set forth in claim 8, wherein the adjustable element within the sleeve portion comprises a cross-hair reticle.

10. A telescope as set forth in claim 8, wherein the adjustable element within the sleeve portion comprises a cross-hair reticle and wherein the eye-piece assembly adjusting mechanism comprises a support member for the eye-piece assembly, and means co-operatively engaging the support member within the sleeve portion and extending to a position exposed outwardly of the sleeve portion between the spaced seat-forming portions whereby the eye-piece assembly within said sleeve portion may be aligned with said cross-hair reticle.

11. A telescope comprising a barrel having a neck portion defined between spaced portions forming seats, an eye-piece assembly carried in said neck portion and having portions projecting at an end thereof, an adjustable element carried within said neck portion in alignment with said eye-piece assembly, means accessible between said seat-forming portions to adjust said element as well as said eye-piece assembly within the neck portion, a cover comprising a sleeve encircling said neck portion and threadedly secured at one end in one of said seats, said sleeve having an inwardly curled end forming an annular shoulder adapted to engage the other of said seats to prevent access of foreign matter to the adjustment means when the cover is in place on said seats.

12. A telescope comprising a barrel having a neck portion defined between cover mounting portions, at least one of which is threaded and another of which provides a seat facing away from said neck portion, an adjustable element within the neck portion, adjusting means on said neck portion accessible from outside of the barrel to adjust said element within the barrel, and a cover comprising a sleeve encircling said neck portion and sealingly secured to the cover mounting portions, said sleeve being formed for threaded engagement with said threaded cover mounting portion, and for frictional engagement on the seat provided by the other cover mounting portion and a resilient gasket compressible on said seat by the cover whereby to prevent access of foreign matter to the adjusting means when the cover is in place on said seats.

ADOLPH LANGSNER.